United States Patent
Tian et al.

(10) Patent No.: US 8,682,108 B2
(45) Date of Patent: Mar. 25, 2014

(54) SYSTEM AND METHOD FOR DETERMINING IMAGE PLACEMENT ON A CANVAS

(75) Inventors: Aibo Tian, Austin, TX (US); Xuemei Zhang, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 275 days.

(21) Appl. No.: 13/094,097

(22) Filed: Apr. 26, 2011

(65) Prior Publication Data
US 2012/0257842 A1 Oct. 11, 2012

Related U.S. Application Data

(60) Provisional application No. 61/474,260, filed on Apr. 11, 2011, provisional application No. 61/474,266, filed on Apr. 11, 2011.

(51) Int. Cl.
*G06K 9/32* (2006.01)

(52) U.S. Cl.
USPC ......................................... 382/294

(58) Field of Classification Search
USPC .................. 101/481; 348/E5.055; 358/1.18; 382/216, 294; 716/119
See application file for complete search history.

(56) References Cited

U.S. PATENT DOCUMENTS

| | | | |
|---|---|---|---|
| 6,980,699 B1 | 12/2005 | Okada | |
| 7,352,917 B2 | 4/2008 | Kondo et al. | |
| 7,495,709 B2 | 2/2009 | Abe | |
| 7,689,909 B1 | 3/2010 | Szuszczewicz | |
| 7,756,334 B2 | 7/2010 | Kim et al. | |
| 7,835,571 B2 | 11/2010 | Kaku | |
| 7,852,410 B2 | 12/2010 | Ishii et al. | |
| 2008/0222560 A1 | 9/2008 | Harrison | |
| 2009/0167870 A1 | 7/2009 | Caleca et al. | |
| 2009/0316989 A1 | 12/2009 | Barbieri et al. | |
| 2010/0329550 A1 | 12/2010 | Cheatle | |
| 2012/0257830 A1* | 10/2012 | Tian et al. ...................... 382/173 |

FOREIGN PATENT DOCUMENTS

WO  WO-2011053287  5/2011

OTHER PUBLICATIONS

C. B. Atkins. Blocked recursive image composition. ACM Multimedia 2008: 821-824.*
H. Chao et al., "Blocked recursive image composition with exclusion zones," Proceedings of the 10th ACM Symposium on Document Engineering, pp. 111-114, Sep. 21-24, 2010.*
T. Liu et al, "Learning to Detect a Salient Object," Conference on Computer Vision and Pattern Recognition (CVPR) 2007: 1-8.*

(Continued)

*Primary Examiner* — Gregory F Cunningham

(57) ABSTRACT

A system and a method are disclosed that determine placement of a background image on a canvas and area for placement of foreground images. A system and method include receiving data indicative of an informative zone of a background image and computing an estimated foreground area on a canvas for each candidate placement of the background image on the canvas. The estimated foreground area is computed based on the data indicative of the informative zone and the number of images to be used as foreground images and does not include the informative zone. One of the candidate placements is determined as a selected background placement based on the computed values of estimated foreground area. A composite image can be generated from the background image positioned on the canvas according to the selected background placement and foreground images positioned outside of the informative zone.

20 Claims, 10 Drawing Sheets

(56) References Cited

OTHER PUBLICATIONS

Tip et al., "Content-aware photo-on-photo composition for consumer photos," Proceedings of the 19th ACM international conference on Multimedia, Nov. 28-Dec. 1, 2011, pp. 1549-1552, ACM.*

L. Itti, L. et al, "A model of saliency-based visual attention for rapid scene analysis," IEEE Trans. on PAMI, 20(11):1254-1259, Nov. 1998.

Gao et al.., "MagicPhotobook: designer inspired, user perfected photo albums," Oct. 2009, Proceedings of the 17th ACM international conference on Multimedia, pp. 979-980, ACM.

Rother et al., "Autocollage," Jul. 2006, ACM Transactions on Graphics (TOG), vol. 25, No. 3, pp. 847-852, ACM.

Tian et al., "Content-aware photo-on-photo composition for consumer photos," Proceedings of the 19th ACM international conference on Multimedia, Nov. 28-Dec. 1, 2011, pp. 1549-1552, ACM.

Sandhaus et al., "Employing Aesthetic Principles or Automatic Photo Book Layout," Advances in Multimedia Modeling, Taipei, Taiwan, Jan. 5-7, 2011, Proceedings, Part I, pp. 84-95, Springer Berlin Heidelberg, 2011.

Xiao et al., "Mixed-initiative photo collage authoring," Oct. 2008, Proceedings of the 16th ACM international conference on Multimedia; pp. 509-518, ACM.

Zhang et al., "A spatial extension of CIELAB for digital colorimage reproduction," 1997, Journal of the Society for Information Display, vol. 5, No. 1, pp. 61-63.

* cited by examiner

SYSTEM AND METHOD FOR DETERMINING IMAGE PLACEMENT ON A CANVAS

CROSS-REFERENCE TO RELATED APPLICATIONS

This patent application claims priority to U.S. application No. 61/474,260, titled "System and Method for Determining Image Placement on a Canvas," filed Apr. 11, 2011, and U.S. application No. 61/474,266, titled "System and Method for Determining the Informative Zone of an Image," filed Apr. 11, 2011, each of which are incorporated by reference for the disclosed subject matter as though fully set forth herein. This patent application is related to the U.S. patent application Ser. No. 13/094,531, titled "System And Method For Determining The Information Zone Of An Image," filed Apr. 26, 2011, which is incorporated by reference for the disclosed subject matter as though fully set forth herein.

BACKGROUND

With the rapid increase of the digital consumer image collections, there is a growing trend in personal creation and publication of photo-based products such as photobooks. Many photo composition applications have difficult and slow creation processes, or strong constraints in the final appearance of the composition that are determined by the background artwork or constraints of the composition algorithm. A tool that uses user images for image composition, and facilitates automatic image composition creation would be beneficial.

DETAILED DESCRIPTION

Figure 1A:
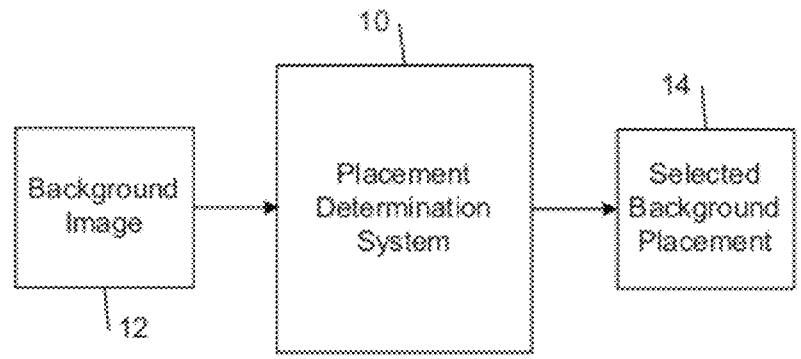
FIG. 1A is a block diagram of an example of a placement determination system for determining image placement.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

An "image" broadly refers to any type of visually perceptible content that may be rendered on a physical medium (e.g., a display monitor or a print medium). Images may be complete or partial versions of any type of digital or electronic image, including: an image that was captured by an image sensor (e.g., a video camera, a still image camera, or an optical scanner) or a processed (e.g., filtered, reformatted, enhanced or otherwise modified) version of such an image; a computer-generated bitmap or vector graphic image; a textual image (e.g., a bitmap image containing text); and an iconographic image.

The term "image forming element" refers to an addressable region of an image. In some examples, the image forming elements correspond to pixels, which are the smallest addressable units of an image. Each image forming element has at least one respective "image value" that is represented by one or more bits. For example, an image forming element in the RGB color space includes a respective image value for each of the colors (such as but not limited to red, green, and blue), where each of the image values may be represented by one or more bits.

"Image data" herein includes data representative of image forming elements of the image and image values.

A "computer" is any machine, device, or apparatus that processes data according to computer-readable instructions that are stored on a computer-readable medium either temporarily or permanently. A "software application" (also referred to as software, an application, computer software, a computer application, a program, and a computer program) is a set of machine-readable instructions that a computer can interpret and execute to perform one or more specific tasks. A "data file" is a block of information that durably stores data for use by a software application.

The term "computer-readable medium" refers to any medium capable storing information that is readable by a machine (e.g., a computer system). Storage devices suitable for tangibly embodying these instructions and data include, but are not limited to, all forms of non-volatile computer-readable memory, including, for example, semiconductor memory devices, such as EPROM, EEPROM, and Flash memory devices, magnetic disks such as internal hard disks and removable hard disks, magneto-optical disks, DVD-ROM/RAM, and CD-ROM/RAM.

As used herein, the term "includes" means includes but not limited to, the term "including" means including but not limited to. The term "based on" means based at least in part on.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one example, but not necessarily in other examples. The various instances of the phrase "in one embodiment" or similar phrases in various places in the specification are not necessarily all referring to the same embodiment.

Described herein are novel systems and methods for automatic selection of a placement on a canvas of a background image and indication of the areas on the canvas for placement of foreground images. Using the placement information, composite images can be generated using an engine for positioning a background image on the canvas according to the selected placement and for positioning foreground images outside of the informative zone. Non-limiting examples of a canvas include a target page of a photobook, a designated layout region of a brochure, magazine or other printable product, photo albums, regions of clothing or other pieces of fabrics or surfaces, printable article surfaces (such as but not limited to a coffee mug or mouse pad), and a screen.

In an example, an image is chosen as a background image, and its position on the canvas is determined according to a system and method described herein. The foreground images are allowed to cover portions of the background image. In an example, foreground images sizing is determined to avoid occlusion of image content in the informative zone of the background image. The informative zone of an image is the region encompassing the areas of interest within the image. A system and method described herein determine a selected background placement of the background image on the canvas and identify foreground image areas such that content in the informative zone of the background image is not occluded by foreground images. The sizing and positioning of the background image on the canvas can depend on the number of foreground images. An estimated foreground area on the canvas is computed based on the data indicative of the informative zone of the background image and the number of images to be used as foreground images. The data indicative of the informative zone of the background image can indicate the size and location of the informative zone. In an example, the sizing and positioning of the background image also may depend on the aspect ratios of the foreground images. A system and method described herein facilitate composition of composite images on a canvas of any dimension. That is, the canvas can be of arbitrary dimensions that differ from the dimensions of the background image. A system and method described herein takes into account simple aesthetic rules in image arrangement on a page to recommend image placement.

To generate a composite image, the background image can be positioned according to the selected placement and then foreground images can be overlaid on top of the background image in the areas outside of the informative zone.

In an example, the systems and methods described herein facilitate composition of photobooks, photo pages, and other similar products, using only the consumers' image collection. In some examples, the theme constraints that can be imposed by typical background art designs used in some photo products may be used with the systems and methods described herein, but are not imposed by the systems and methods herein.

In an example system and method herein for identifying the informative zone, for determining the foreground image areas, or for generating a composite image, the aesthetics of composition is taken into account. For example, regions of a background image that can be covered by foreground images may not be blank or low contrast regions of the background image. In an example, regions of the background image that can be covered by foreground images may be regions with repeated or extended image features. For example, in a composition with a background image having scenes dominated by horizontal patterns (such as mountain ranges), the foreground images can be placed in a vertical arrangement, covering regions of the background image with repeated content. In the aesthetics of composition, regions with repeated or extended image features can be mentally recovered by an observer through visual inference, and as a result may be covered. Also, blank regions of a background image play a role in visual design, as an observer may not feel comfortable looking at a design with no blank region. In an example, foreground images may be placed around the periphery of the background image rather than the center. In another example, the foreground images may be arranged in straight-line or block formations. An irregular arrangement may be created by adding small disturbance to a composition based on a straight-line or block arrangement.

In an example, a system and a method described herein facilitate automatic selection of a background image from a collection of images based on the size of the layout area for foreground images. If there is aspect ratio mismatch between the canvas and background image, or if the selected background image provides insufficient layout area for foreground images, a system and a method also are provided to facilitate sizing and positioning a background image on a canvas with considerations of both foreground image sizing and visual balance.

FIG. 1A shows an example of a placement determination system 10 that provides a selected background placement 14 on a canvas of a background image 12. The placement determination system 10 receives data indicative of the informative zone of the background image 12, and, according to example methods described herein, determines a selected background placement 14 on a canvas of a background image 12. The input to the placement determination system 10 also can be a collection of images from which a background image 12 is chosen. Specifically, the input to placement determination system 10 can be a collection of images that includes the background image 12 and other images (including images to be used as foreground images).

An example source of images (including background image 12 and foreground images) is personal photos of a consumer taken of family members and/or friends. Another example source is images captured by an image sensor of, e.g., entertainment or sports celebrities, or reality television individuals. The images can be taken of one or more members of a family near an attraction at an amusement park. In an example use scenario, a system and method disclosed herein is applied to images in a database of images, such as but not limited to images captured using imaging devices (such as but not limited to surveillance devices, or film footage) of an area located at an airport, a stadium, a restaurant, a mall, outside an office building or residence, etc. It will be appreciated that other sources are possible.

Figure 1B:
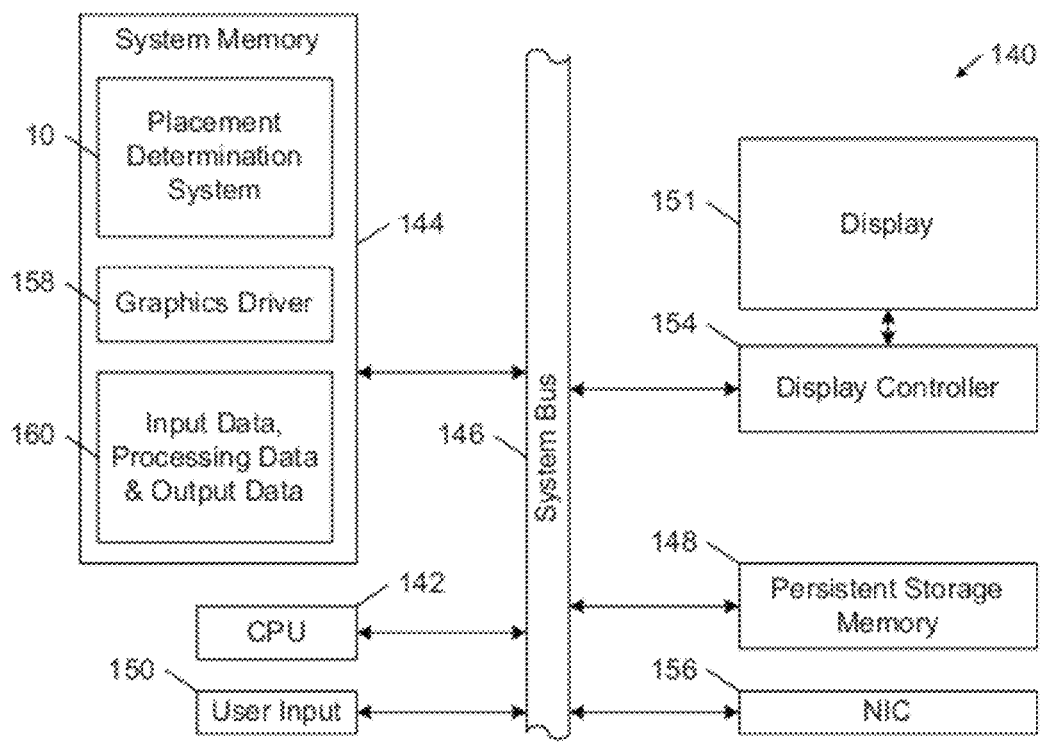
FIG. 1B is a block diagram of an example of a computer system that incorporates an example of the placement determination system of FIG. 1A.

FIG. 1B shows an example of a computer system 140 that can implement any of the examples of the placement determination system 10 that are described herein. The computer system 140 includes a processing unit 142 (CPU), a system memory 144, and a system bus 146 that couples processing unit 142 to the various components of the computer system 140. The processing unit 142 typically includes one or more processors, each of which may be in the form of any one of various commercially available processors. The system memory 144 typically includes a read only memory (ROM) that stores a basic input/output system (BIOS) that contains start-up routines for the computer system 140 and a random access memory (RAM). The system bus 146 may be a memory bus, a peripheral bus or a local bus, and may be compatible with any of a variety of bus protocols, including PCI, VESA, Microchannel, ISA, and EISA. The computer system 140 also includes a persistent storage memory 148 (e.g., a hard drive, a floppy drive, a CD ROM drive, magnetic tape drives, flash memory devices, and digital video disks) that is connected to the system bus 146 and contains one or more computer-readable media disks that provide non-volatile or persistent storage for data, data structures and computer-executable instructions.

A user may interact (e.g., enter commands or data) with the computer system 140 using one or more input devices 150 (e.g., a keyboard, a computer mouse, a microphone, joystick, and touch pad). Information may be presented through a user interface that is displayed to a user on the display 151 (implemented by, e.g., a display monitor), which is controlled by a display controller 154 (implemented by, e.g., a video graphics card). The computer system 140 also typically includes peripheral output devices, such as speakers and a printer. One or more remote computers may be connected to the computer system 140 through a network interface card (NIC) 156.

As shown in FIG. 1B, the system memory 144 also stores the placement determination system 10, a graphics driver 158, and processing information 160 that includes input data, processing data, and output data. In some examples, the placement determination system 10 interfaces with the graphics driver 158 to present a user interface on the display 151 for managing and controlling the operation of the placement determination system 10.

The placement determination system 10 can include discrete data processing components, each of which may be in the form of any one of various commercially available data processing chips. In some implementations, the placement determination system 10 is embedded in the hardware of any one of a wide variety of digital and analog computer devices, including desktop, workstation, and server computers. In some examples, the placement determination system 10 executes process instructions (e.g., machine-readable instructions, such as but not limited to computer software and firmware) in the process of implementing the methods that are described herein. These process instructions, as well as the data generated in the course of their execution, are stored in one or more computer-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

The principles set forth in the herein extend equally to any alternative configuration in which placement determination system 10 has access to background image 12 and other images (including foreground images). As such, alternative examples within the scope of the principles of the present specification include examples in which the placement determination system 10 is implemented by the same computer system, examples in which the functionality of the placement determination system 10 is implemented by a multiple interconnected computers (e.g., a server in a data center and a user's client machine), examples in which the placement determination system 10 communicates with portions of computer system 140 directly through a bus without intermediary network devices, and examples in which the placement determination system 10 has a stored local copies of the background image 12 and other images (including foreground images).

Figure 2A:
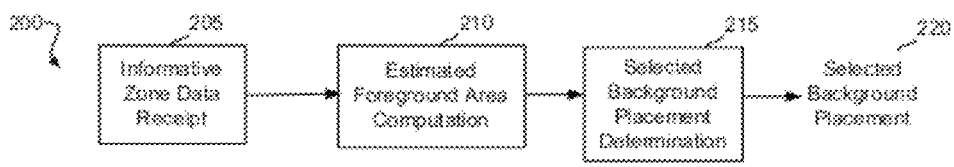
FIG. 2A is a block diagram of an illustrative functionality implemented by an illustrative computerized placement determination system.

Referring now to FIG. 2A, a block diagram is shown of an illustrative functionality 200 implemented by placement determination system 10 for determining a selected background placement of a background image on a canvas, consistent with the principles described herein. Each module in the diagram represents an element of functionality performed by the processing unit 142. Arrows between the modules represent the communication and interoperability among the modules. In brief, data indicative of the informative zone of a background image is received in block 205, an estimated foreground area is computed in block 210, and a selected background placement 220 is determined by block 215.

Referring to block 205, data indicative of the informative zone is received. The data indicative of the informative zone can be image data. For example, the data indicative of the informative zone can be pixel values. Non-limiting examples of data indicative of the informative zone of an image include pixel coordinates representing a bounding box of the informative zone relative to the image, a binary mask the same size as the image with informative zones indicated by the "ON" pixels, or a set of parameters describing a shape such as center and diameter of a circular informative zone. In an example, data indicative of the informative zone of an image pre-selected as the background image 12 is received in block 205. In another example, the informative zone of each image in a collection of images is received in block 205, and a background image 12 is chosen as one of the images in the collection. For example, the background image 12 can be determined as the image in the collection that provides the largest layout region outside of the informative zone where foreground images can be placed (i.e., the largest foreground area). In this example, the same module that receives the informative zone data, or a different module, can be used to select the background image 12 from among a collection of images based on the data indicative the informative zones of each the images. FIGS. 3A to 3D show non-limiting examples of images 300 with an indication of their informative zones 305a to 305d, respectively. In these examples, the informative zone 305a to 305d is bounded in a rectangular zone.

Figure 4A:
FIG. 4A shows an example image.
Figure 4B:
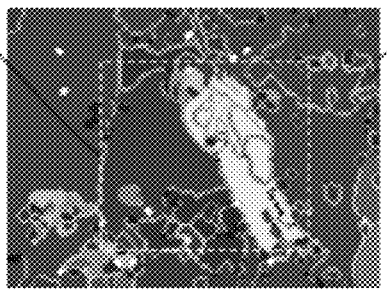
FIG. 4B shows an example of informative zone determination based on a saliency map of the image of FIG. 4A.

In an example, the data indicative of the informative zone of an image can be determined by a module based on a saliency map of the image. That is, the data indicative of the informative zone can correspond to the region of interest of the background image as determined using a saliency map. A saliency map shows different regions of an image, including the region of interest (salient region) of the image. The data indicative of the informative zone of the image can be data indicating a bounded portion of the image that encompasses the salient region. For example, the bounded portion can be a zone in the shape of a square, rectangular, circle, or other polygon, that encompasses the salient region. FIG. 4B shows a saliency map 410 of the example image 405 of FIG. 4A. The informative zone 415 of the image 405 is indicated as the region bounded by the dashed lines in FIG. 4B. The salient region of the image can be determined using any technique in the art. As a non-limiting example, the saliency technique disclosed in co-pending U.S. patent application Ser. No. 12/491,067, filed Jun. 24, 2009, which is incorporated herein by reference in its entirety and for all purposes, can be used to determine salient region of the image. A non-limiting example of saliency map generation is as follows. Since an image can include numerous image colors, a much smaller number of broad color value clusters can be selected for use in the saliency analysis. Each pixel of the image can be assigned to a representative color cluster based on the pixel's color value. Adjacent pixels of the same color cluster are then grouped into regional segments. In an example, each of the regional segments is classified as a subject region or a non-subject region. Subject regions are generally the salient regions. A subject region an image can be most salient to a human viewer, and tends to occupy a relatively large percentage of the image area. In an example, the subject region is located at or near the center of the image, and has relatively unusual color. An example of a non-subject region can include relatively large regions with common colors, and can extend to the edge of the image. A separate module (not shown in FIG. 2A) can be used to implement the saliency method and to determine the data indicative of the informative zone of an image(s) to provide to block 205.

In another example, the data indicative of the informative zone of an image can be determined by a module according to the systems and methods described in U.S. application No. 61/474,266, titled "System and Method for Determining the Informative Zone of an Image," filed Apr. 11, 2011, and co-pending U.S. application no. 201005327US02, titled "System and Method for Determining the Informative Zone of an Image," filed on even date herewith, which are incorporated herein by reference in their entireties and for all purposes. An example system and method to determine an informative zone of an image is as follows. Image data representative of an image is received and the non-redundant regions of the image are determined based on analysis of patterns of the image data. An area of the image that encompasses the non-redundant regions of the image is determined as the informative zone of the image. In an example, a process for determining the redundancy of regions of the image and for determining the non-redundant regions of the image is as follows. Image data representative of the image is received and a content redundancy measure along at least one dimension of the image is determined based on the image data. The content redundancy measure is indicative of a deviation from a linear prediction from a progression of neighboring points along the dimension in the image. The content redundancy measures along each of the axes are combined to provide a redundancy profile along the respective axis. The locations within the image where the redundancy profiles exceed respective pre-determined thresholds are determined. The locations within the image where the profiles exceed the respective pre-determined thresholds are indicative of the non-redundant regions of the image. In another example, a process for determining the redundancy of regions of the image and for determining the non-redundant regions of the image is as follows. Image data representative of an image is received. A homogeneity measure of content gain of the image is determined based on the image data. The homogeneity measure is values indicative of an upper bound of the content gain between an area of the image and a reference point near an end of the area. A continuity measure of the image is determined based on the image data. The continuity measure is values indicative of the structure of the image. A content gain measure of the image is determined. The content gain measure is a combination of the homogeneity measure and the continuity measure. A content redundancy measure of the image is determined based on the content gain. The non-redundant regions of the image are determined based on the content redundancy measure of the image.

In block 210 of FIG. 2A, an estimated foreground area is computed by a module for each candidate placement of the background image 12 on a canvas. In an example, the canvas has different dimensions from the background image. In this example, the estimated foreground area includes the layout regions of the background image, outside of the informative zone, where foreground images can be placed, as well as parts of the canvas outside of the background image 12. The estimated foreground area is computed based on the data indicative of the informative zone and the number of images to be used as foreground images. The estimated foreground area does not include the informative zone.

Each candidate placement is a different placement variation of the background image on the canvas. In an example, candidate placements are evaluated for many possible placements of the background image on the canvas. In another example, a number of candidate placements of the background image, including left-aligned, right-aligned, corner-aligned, and center placement, are evaluated. The choice of the number and configurations of candidate placements could be guided by aesthetics constraints or by computational cost considerations.

In an example, the aspect ratio of each image to be used a foreground image, and width and height of the canvas, are also included in the computation of the estimated foreground area.

In an example, a system and method herein do not pre-impose a particular foreground layout when computing the estimated foreground area for a candidate placement of the background image. In an example, the estimated foreground area can be determined based on certain properties of the expected foreground layout outcome. Non-limiting examples of properties of a foreground layout outcome include that the foreground layout does not crop any foreground images, the foreground images are rectangular in shape and do not overlap each other in the layout, the foreground images are organized in a tight packing rectilinear way, and the outline of the final layout is rectangular or a combination of multiple rectangles. At least one of these properties can be applied to determine the expected foreground layout outcome based on the algorithm ultimately used for providing the layout, such as but not limited to a blocked recursive image composition (BRIC). A system and method described herein provide the estimated foreground area without pre-imposing a particular foreground layout.

Figure 5:
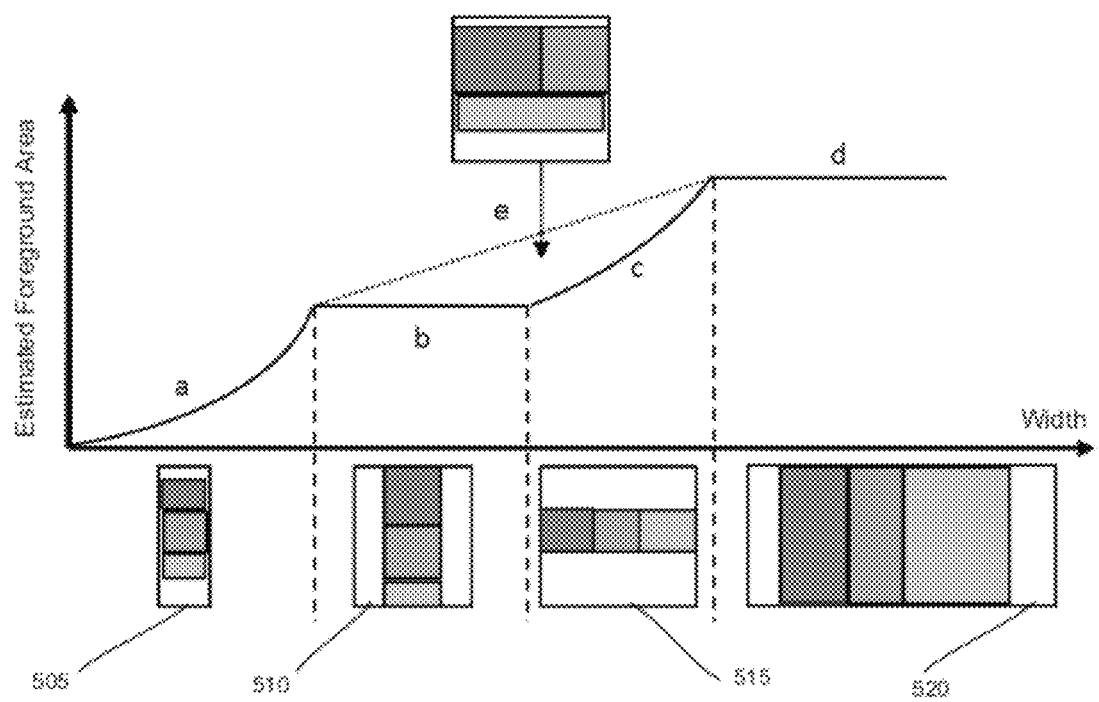
FIG. 5 shows a plot of an example computation of estimated foreground area versus canvas width for canvases of differing dimensions.

In various examples, the exact estimated foreground area is computed, or the estimated foreground area is determined as a combination (in a non-limiting example, a linear combination) of an upper bound and a lower bound on the computed foreground area. FIG. 5 illustrates different examples of computation of the estimated foreground area. The example canvases 505, 510, 515, 520 have different dimensions and different available layout regions. The boxes within each canvas 505, 510, 515, 520 represent foreground images. Each canvas 505, 510, 515, 520 is illustrated as having the same height (set to 1) and their widths along the horizontal axis differ. The curve shows a plot of estimated foreground area versus the width of the canvas. The portion of the curve labeled a relates to computation over canvas 505, portion b of the curve relates to computation over canvas 510, portion c of the curve relates to computation over canvas 515, and portion d of the curve relates to computation over canvas 520.

As illustrated in FIG. 5, for canvases 510 and 520, the maximum estimated foreground area is constrained by canvas width and height respectively. For canvas 515, an estimated foreground area is not computed directly since the foreground images may be arranged in several different ways to achieve optimal space usage than a single row or single column of images. The estimated foreground area can be determined from a combination of the lower and upper bounds of foreground image area. The lower bound is the single row/column layout (curves b and d in FIG. 5). The upper bound is the area of the entire region (100% fill efficiency) illustrated as curve e in FIG. 5). If the intended layout algorithm considers space usage as one of the optimization terms, the average fill efficiency can increase with the number of foreground photos, as there is a larger degree of freedom for optimization when there are more foreground photos. The estimated foreground area approaches the upper bound when the number of foreground images is large. In an example, a linear combination of the upper and lower bounds is used, weighted with relative weights determined by a function of image count. An example of computation of the estimated foreground area using upper and lower bounds is as follows:

$$S_{fore} = \begin{cases} \sum_{i=1}^{n} asp_i * w^2 & \sum_{i=1}^{n} asp_i \leq \frac{h}{w} \\ f(n)*S_{lower} + (1-f(n))*S_{upper} & \text{otherwise,} \\ \sum_{i=1}^{n} \frac{1}{asp_i} * h^2 & \sum_{i=1}^{n} \frac{1}{asp_i} \leq \frac{w}{h} \end{cases} \quad (1)$$

$$S_{lower} = \max\left(\sum_{i=1}^{n} asp_i * w^2, \sum_{i=1}^{n} \frac{1}{asp_i} * h^2\right)$$

$$S_{upper} = w*h$$

$$f(n) = c^{\frac{1}{n-2}}$$

where w and h represent the width and height of the layout region, $asp_i$ is the aspect ratio of the i-th foreground image, n is the number of foreground images, and c is a constant. The lower bound of estimated foreground area can provide a reasonable "tight packing" of images, and can be similar to the upper bound (portion e of the curve).

In an example, a scaling factor may be applied to the background image in the computation of the estimated foreground area. The value of the scaling factor is constrained by a ratio of the total foreground image area to the background image area. In an example, the background image fills as much of the canvas as possible to achieve a near "full bleed" effect. The foreground images can be estimated to be at a large enough size that allows adequate presentation of image details, and to achieve a sense of balance relative to the background image size. The informative zone of the selected background image may be so large as to leave little space for foreground photo layout. A scaling factor can be applied to the background image to scale it down and allow room for foreground photos. In another example, the scaling factor can be applied to make the background image larger.

Figure 6:
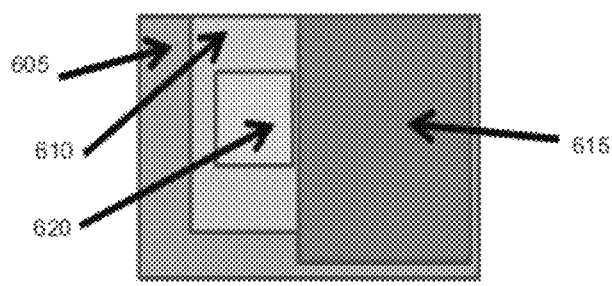
FIG. 6 shows an example canvas with an arrangement of background image and foreground image area.

FIG. 6 illustrates a candidate placement of a background image 610 on a canvas 605. The projected foreground area 615 for placement of foreground images is illustrated as positioned to the right of the informative zone 620 of the background image 610. Given a scale of the background image 610, the estimated foreground area can be computed with considering foreground layout regions on either or both sides of the informative zone 615 of the background image 610. In an example, the candidate placement of the background image 610 on the canvas 605 that provides the largest foreground area is considered as the estimated foreground area. In FIG. 6, the direction relative to the informative zone 620 of the background image 610 is considered the main direction.

An estimated foreground area is computed, and the size of the average foreground image relative to the background image can be estimated. A scaling factor can be determined that facilitates little scaling down of the background image and achieve a minimum foreground image-to-background image size ratio. The foreground image-to-background image size ratio can be used to ensure that the foreground images are sufficiently large, but smaller than background photo, and foreground photo area increases as the number of photo increases. Given a minimum desired foreground image-to-background image size ratio, the scaling factor for the background image can be constrained by that ratio. An example of the equations used for computation of the ratio bound is as follows:

$$S_{back} <= \frac{S_{fore}}{\text{ratio}}, \quad (2)$$

$$\text{ratio} = \min\left(\frac{c}{n^a}, \frac{1}{n}\right), a <= 1 \quad (3)$$

where $S_{back}$ and $S_{fore}$ are background image area and total estimated foreground image area, respectively, n is the number of foreground images, a and c are coefficients. Given the constraints imposed by equations (2) and (3), the scaling factor for the background image can be computed as follows:

$$s = \arg\max_s S_{fore}(s), \quad (4)$$

where s is the scaling factor.

In block 215, one of the candidate placements of the background images on the canvas is determined by a module as the selected background placement 220. The determination is made based on the values of the estimated foreground area computed in block 210. For example, the candidate placement having the highest value of estimated foreground area can be determined as the selected background placement 220.

Figure 7:
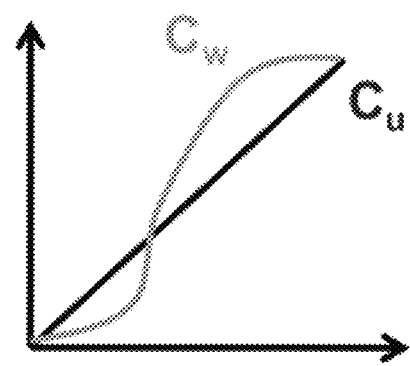
FIG. 7 shows an example plot of the cumulative weight distribution ($C_{wi}$) and the cumulative uniform distribution ($C_{ui}$) across the canvas.

The estimated foreground photo area and a measure of the visual balance of the composition are used by the module to determine the selected background placement 220 of the background image on the canvas. In an example, the measure of visual balance can be computed by assigning a value of a weight to each of the foreground images, and the informative zone of the background image, and computing the average difference of the cumulative weight distribution and cumulative uniform distribution according to the expression:

$$\text{balance} = 1 - \frac{\sum_{i=1}^{k} |c_{wi} - c_{ui}|^b}{k}, \quad (5)$$

along at least one of the dimensions of the canvas, where $C_{wi}$ is a cumulative weight at a location of the i-th piece of the canvas, $C_{ui}$ (is a cumulative uniform distribution at the location, k is the number of pieces the canvas is divided into and at which a deviation of $C_{wi}$ from $C_{ui}$ is determined, and b is a coefficient. FIG. 7 shows an example plot of the weight distribution ($C_{wi}$) and the uniform distribution ($C_{ui}$) are the values of cumulative weight across the pieces (i) of the canvas. The uniform distribution can be considered in some examples as the ideal weight distribution for the entire composition. The weight distribution is illustrated as being proportional to the area of the canvas, and weighted differently for different kinds of regions of the canvas, such as regions with foreground images, the background image and the informative zone of the background image. In an example, the measure of visual balance can be determined along the main direction only. The cumulative weight $C_{wi}$ can be computed as the cumulative weight in one dimension. For example, if $C_{wi}$ is computed for the X dimension, the total area of images in the area from x=1 . . . i is considered with full height. In another example, the measure of visual balance along the secondary direction can be determined in a similar manner, and also be used in the determination of the measure of visual balance. The deviation from the uniform weight distribution can be computed at selected locations, including at the center of the informative zone of the background image and at the center of the foreground image layout area(s). In an example, there can be more than one single foreground layout areas, depending on whether the candidate placement of the background image is at the center of the canvas or to one side of canvas. In various examples, the measure of visual balance can be determined as a combination of the weight deviation determined at all locations on the canvas, or at selected locations on the canvas as described above.

A candidate placement score can be computed by a module for each candidate placement of the background image on the canvas based on the value of estimated foreground area of the candidate placement and its measure of visual balance. In this example, the candidate placement score is used to determine the selected background placement 220 of the background image on the canvas. For example, the product of the estimated foreground area and the measure of visual balance is used to provide an overall candidate placement score of a particular candidate placement of the background image as follows:

$$\text{score} = S_{fore} * (B_x * B_y)^\alpha \quad (11)$$

where $S_{fore}$ is the estimated foreground area, $B_x$ is the balance metric computed along a horizontal direction relative to the canvas, $B_y$ is a balance metric computed along a vertical direction relative to the canvas, and $\alpha$ is a numerical value that indicates the weight of the balance metric relative to the estimated foreground area. In an example implementation, the exponent $\alpha$ is set to the value 2.

In an example, the candidate placement having the highest value of candidate placement score is determined by a module as the selected background placement 220.

Figure 2B:
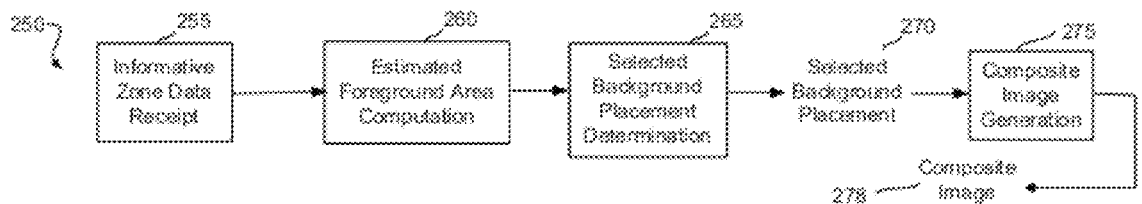
FIG. 2B is a block diagram of another illustrative functionality implemented by an illustrative computerized placement determination system.

Referring now to FIG. 2B, a block diagram is shown of an illustrative functionality 250 implemented by placement determination system 10 for determining a selected background placement of a background image on a canvas, followed by generation of a composite image according to the placements of the selected background placement, consistent with the principles described herein. Each module in the diagram represents an element of functionality performed by the processing unit 142. Arrows between the modules represent the communication and interoperability among the modules.

Data indicative of the informative zone of a background image is received in block 255, as described above in connection with block 205. An estimated foreground area is computed in block 260, as described above in connection with block 210. A selected background placement 270 is determined by block 265, as described above in connection with block 205. The description of these operations will not be repeated here for brevity. In block 275, a module is used to generate a composite image based on the selected background placement 270 determined in block 265 to provide a composite image 278.

Figures 8A, 8B:
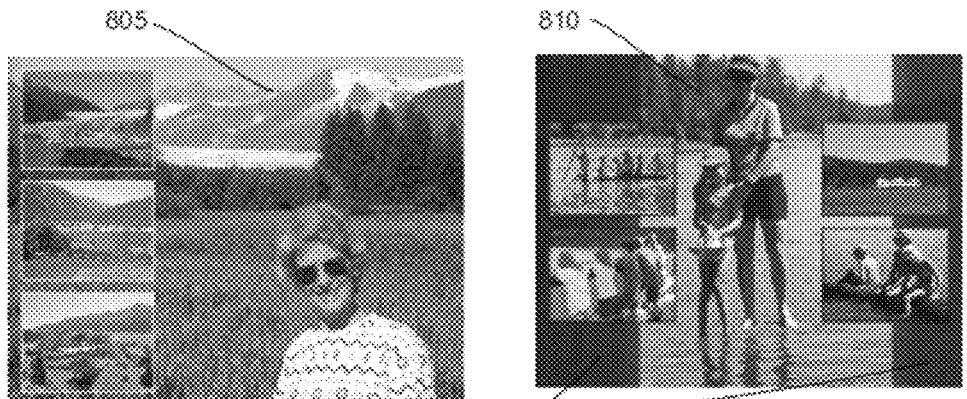
FIGS. 8A to 8D show illustrative examples of composite images generated on a canvas based on a selected background placement.
Figure 8C:
Figure 8D:
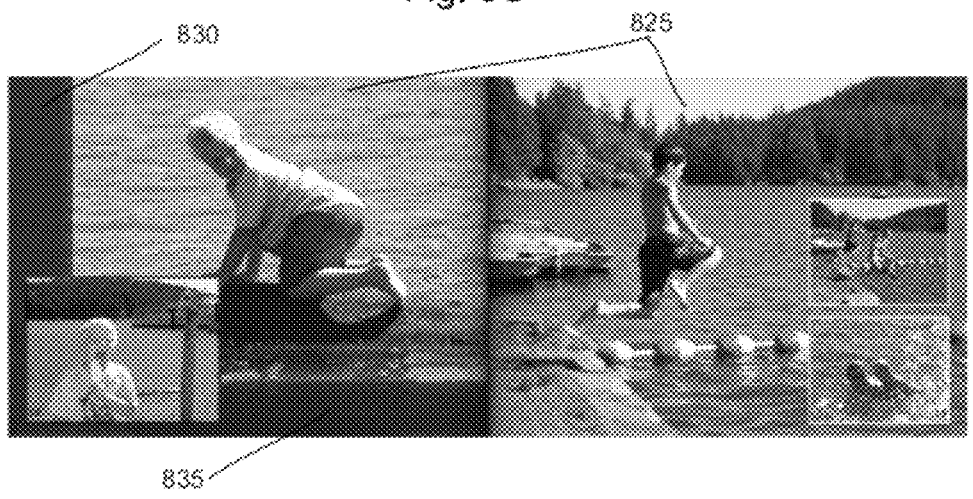

In the implementation of block 275, a composite image 278 is generated by a module from the background image positioned on the canvas according to the selected background placement 270, and foreground images positioned outside of the informative zone. Foreground images can be overlaid on the background image on the canvas using a layout tool that accounts for exclusion zones. The exclusion zone would include the informative zone of the background image. Examples of layout tools include ExBRIC described in H. Chao et al., "Blocked recursive image composition with exclusion zones," Proceedings of the 10$^{th}$ ACM Symposium on Document Engineering, pp. 111-114, Sep. 21-24, 2010, or the layout tool described in International Application No. PCT/US2009/062401, filed Oct. 28, 2009. FIGS. 8A to 8D show illustrative examples of composite images 805, 810, 820, and 825 generated on a canvas based on the selected background placement derived using a system and method described herein. FIG. 8D shows example pages from a photobook.

In an example, prior to or during the implementation of the composite image generation in block 275, the background image may be modified to provide an adapted background image. If the background image has a different aspect ratio from the canvas, or there is not enough layout space for the foreground photo, background image adaptation may be performed by a module to adapt the size and dimensions of the background image to conform to the canvas. For example, if a dimension along an axis of the canvas is greater than a dimension of the background image along the same axis, background image adaptation may be performed to reflect a portion of the background image along that axis to provide an adapted background image that conforms to the dimensions of the canvas. In another example, the content from portions of other images in the collection of images can be added to extend the dimension of the background image along the axis to provide an adapted background image that conforms to the dimensions of the canvas the background. For example, high redundancy content from portions of another image in the collection that are of a similar color to the background image can be used. The reflected portion of background image, or added content from the other image, herein referred to as adaptation areas, are introduced to cover the regions on the canvas not covered by the background image. The adaptation areas have redundant content and can be covered by foreground photos. Different effects can be used to blend the adaptation areas with the background image or to emphasize the transition to the adaptation areas.

Figure 2C:
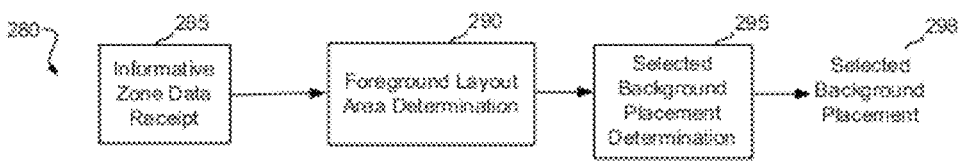
FIG. 2C is a block diagram of another illustrative functionality implemented by an illustrative placement determination system for determining a selected background placement of a background image on a canvas.
Figure 3A:
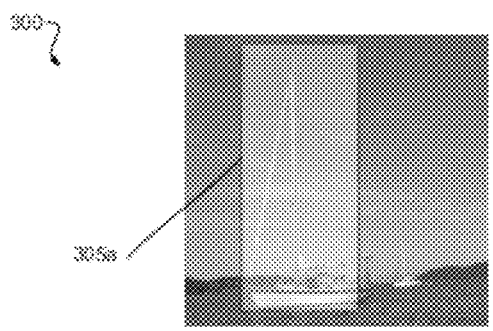
FIGS. 3A-3D show the informative zones of example images.
Figure 3B:
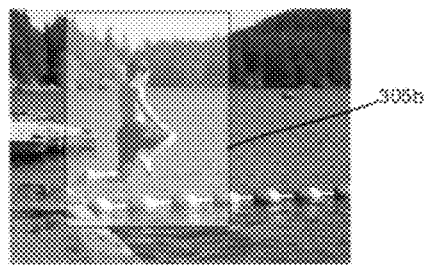
Figure 3C:
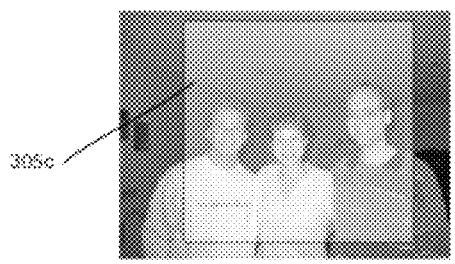
Figure 3D:
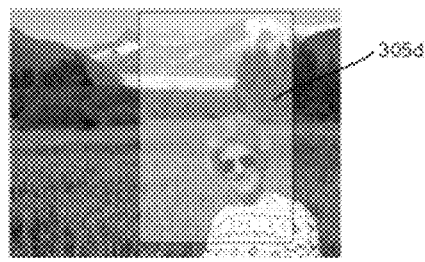

Referring now to FIG. 2C, a block diagram is shown of another illustrative functionality 280 implemented by placement determination system 10 for determining a selected background placement of a background image on a canvas, consistent with the principles described herein. Each module in the diagram represents an element of functionality performed by the processing unit 142 and the arrows between the modules represent the communication and interoperability among the modules. Data indicative of the informative zone of a background image is received in block 285, as described above in connection with block 205. In block 290, the foreground layout area on a canvas is determined based on the data indicative of the informative zone, where the foreground layout area does not include the informative zone. The foreground layout area can be determined using a foreground layout tool. As non-limiting examples, ExBRIC described in H. Chao et al., or the layout tool described in International Application No. PCT/US2009/062401, can be used. In this example, the foreground layout area determined in block 290 is the area of the actual layout returned by the foreground layout tool. In block 295, a selected background placement 298 is determined using a similar process as described in connection with block 205, except that the foreground layout area determined in block 290 is substituted in the computations in place of the estimated foreground area. A module can be used to generate a composite image based on the selected background placement 298 determined in block 295 to provide a composite image according to the principles described herein.

Figure 9A:
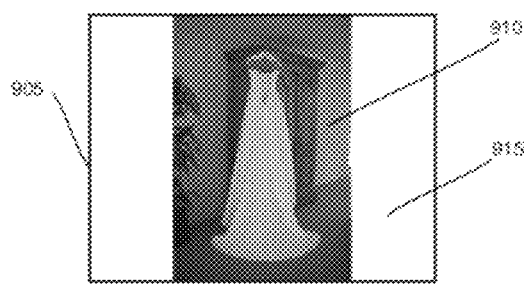
FIGS. 9A-9D illustrate examples of adaptation of a background image to a canvas with a different aspect ratio.
Figure 9B:
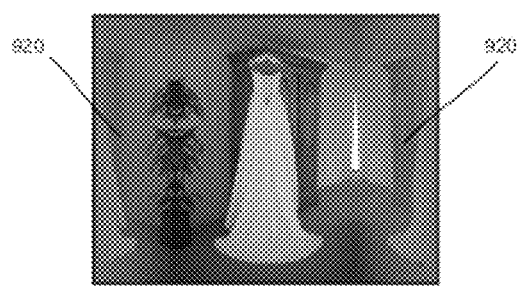
Figure 9C:
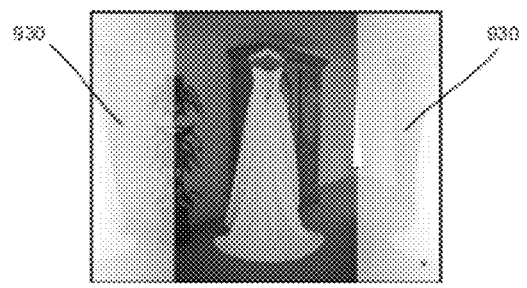
Figure 9D:
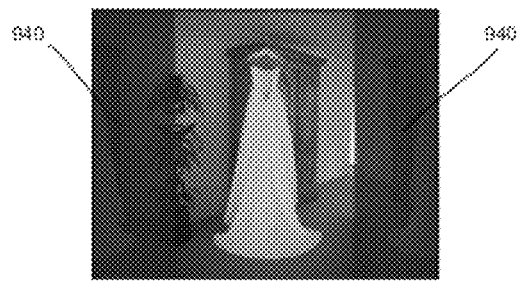

FIGS. 9A-9D illustrate examples of adaptation of a background image to a canvas with a different aspect ratio. FIG. 9A shows the canvas 905, the background image 910, and the uncovered areas of the canvas 915. FIGS. 9B to 9D show adapted background images that conform to the dimensions of the canvas, where the adaptation areas of each of the adapted background images are generated with differing stylistic variations. In the examples of FIGS. 9B to 9D, the adaptation areas are reflected portions of the background image. In other examples, the content from portions of other images in the collection of images are used to form the adaptation areas. In FIG. 9B, the adaptation areas 920 are faded to the average color of the background image. In FIG. 9C, the adaptation areas 930 are faded to partial transparency, and the partial transparency is white. In FIG. 9D, the adaptation areas 940 are faded to partial transparency, and the partial transparency is black. The gradient of the fading can be set by various parameters so that the partial transparency areas of FIGS. 9C and 9D allow the canvas color to show through. The transitions to the adaptation areas can be partially occluded by foreground photos. FIGS. 8B and 8D show composite images generated with adaptation areas (815 in FIG. 8B and 830, 835 in FIG. 8D) that are faded to partial transparency, where the partial transparency is black.

Figure 10:
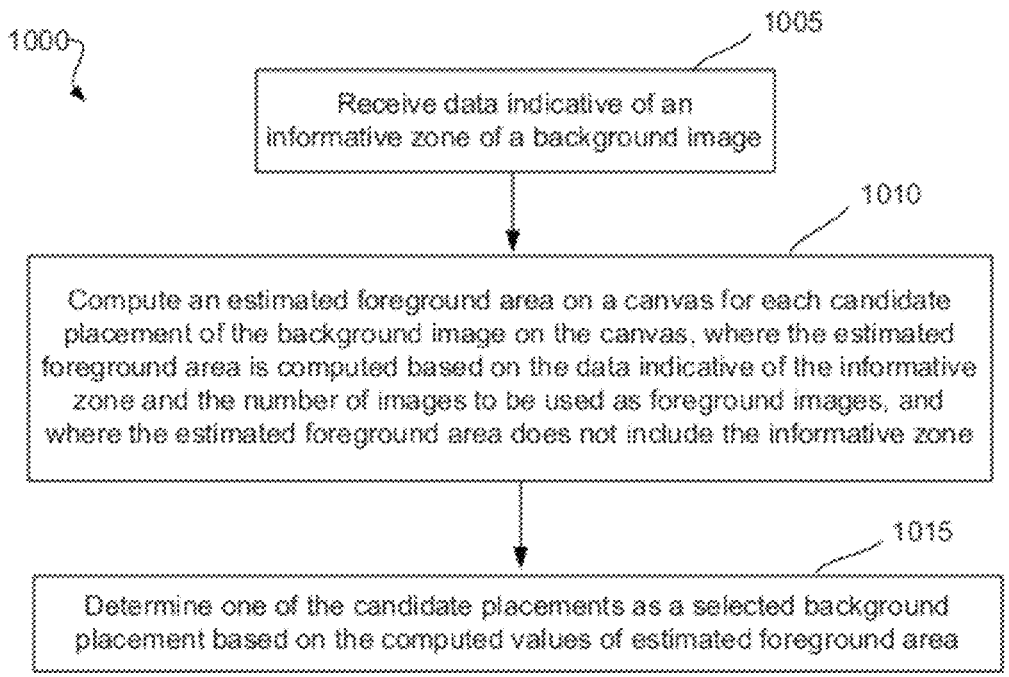
FIG. 10 shows a flow chart of an example process for determining a selected placement of a background image.

FIG. 10 shows a flow chart of an example process 1000 for determining a selected placement of a background image. The processes of FIG. 10 can be performed by modules as described in connection with FIG. 2A. In block 1005, data indicative of an informative zone of a background image is received. In block 1010, an estimated foreground area on a canvas for each candidate placement of the background image is computed. The estimated foreground area is computed based on the data indicative of the informative zone and the number of images to be used as foreground images, where the estimated foreground area does not include the informative zone. In block 1015, one of the candidate placements is determined as a selected background placement based on the computed values of estimated foreground area. A composite image can be generated from the background image positioned on the canvas according to the selected background placement and foreground images positioned outside of the informative zone.

Figure 11:
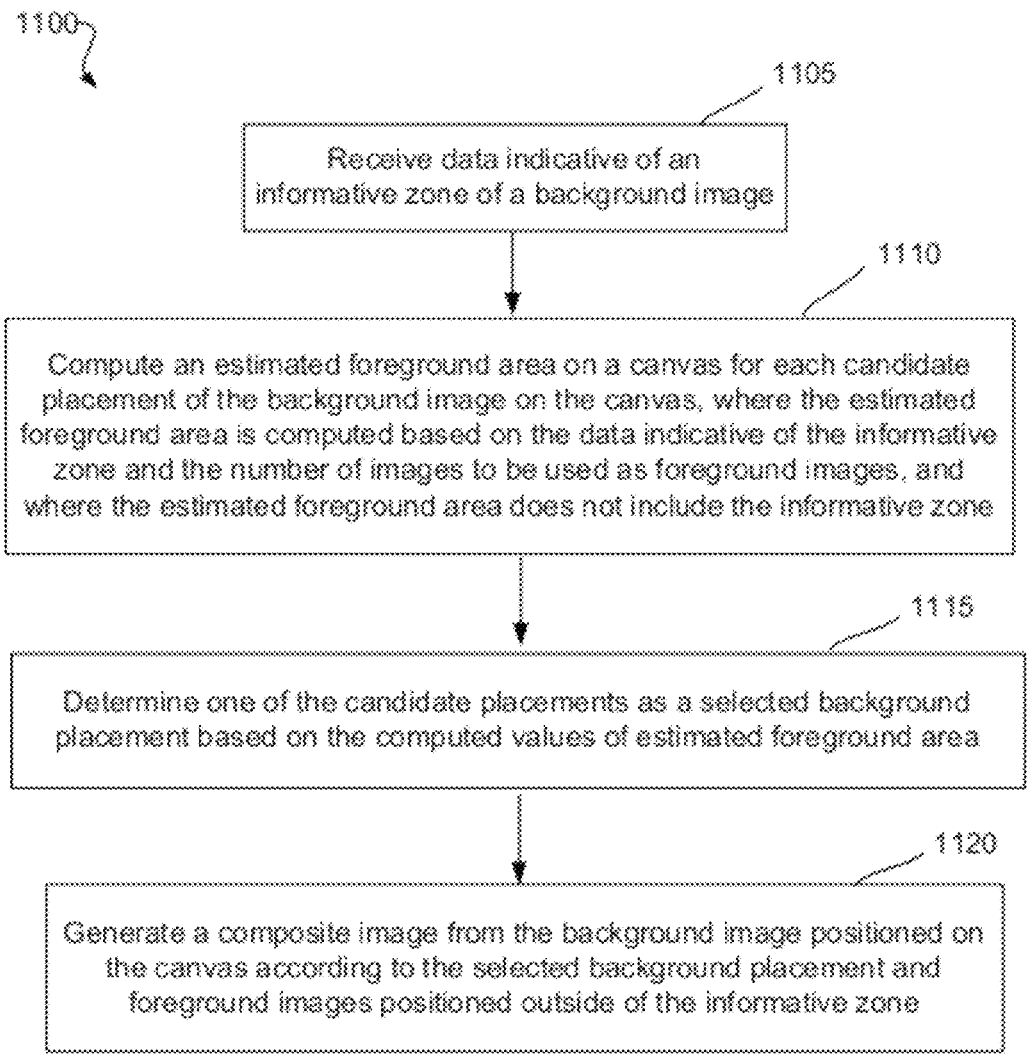
FIG. 11 shows a flow chart of an example process for determining a selected placement of a background image and generating a composite image based on the selected placement.

FIG. 11 shows a flow chart of an example process 1100 for determining a selected placement of a background image and generating a composite image based on the selected placement. The processes of FIG. 11 can be performed by modules as described in connection with FIGS. 2A and 2B. In block 1105, data indicative of an informative zone of a background image is received. In block 1110, an estimated foreground area on a canvas for each candidate placement of the background image is computed. The estimated foreground area is computed based on the data indicative of the informative zone and the number of images to be used as foreground images, where the estimated foreground area does not include the informative zone. In block 1115, one of the candidate placements is determined as a selected background placement based on the computed values of estimated foreground area. In block 1120, a composite image is generated from the background image positioned on the canvas according to the selected background placement and foreground images positioned outside of the informative zone.

Figure 12:
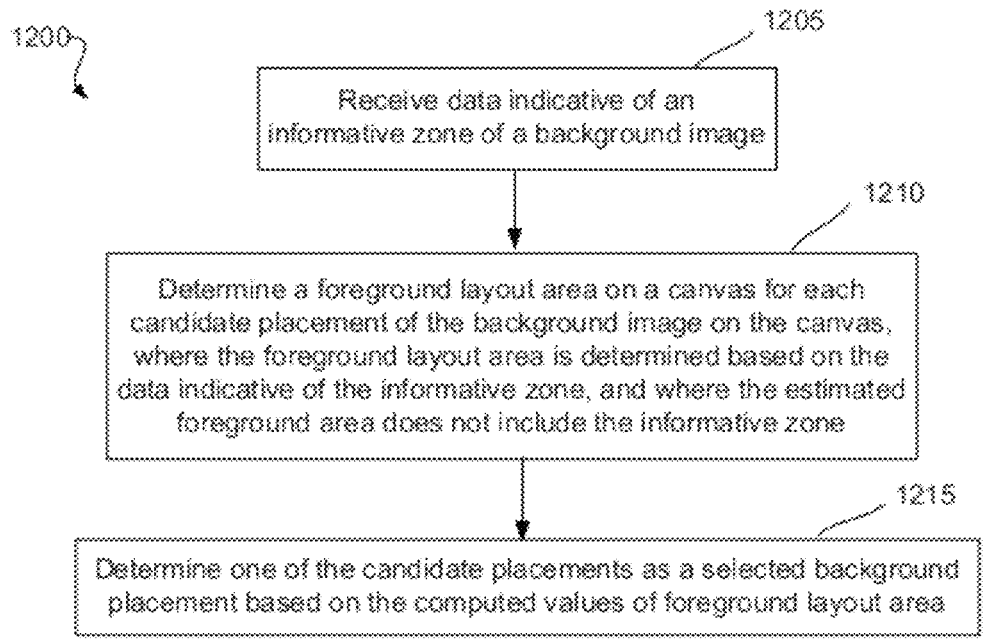
FIG. 12 shows a flow chart of an example process for determining a selected placement of a background image.

FIG. 12 shows a flow chart of an example process 1200 for determining a selected placement of a background image. The processes of FIG. 12 can be performed by modules as described in connection with FIG. 2C. In block 1205, data indicative of an informative zone of a background image is received. In block 1210, a foreground layout area on a canvas for each candidate placement of the background image is determined. The foreground layout area is determined based on the data indicative of the informative zone, where the foreground layout area does not include the informative zone. In block 1215, one of the candidate placements is determined as a selected background placement based on the computed values of foreground layout area. A composite image can be generated from the background image positioned on the canvas according to the selected background placement and foreground images positioned outside of the informative zone.

Many modifications and variations of this invention can be made without departing from its spirit and scope, as will be apparent to those skilled in the art. The specific examples described herein are offered by way of example only, and the invention is to be limited only by the terms of the appended claims, along with the full scope of equivalents to which such claims are entitled.

As an illustration of the wide scope of the systems and methods described herein, the systems and methods described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

All references cited herein are incorporated herein by reference in their entirety and for all purposes to the same extent as if each individual publication or patent or patent application was specifically and individually indicated to be incorporated by reference in its entirety herein for all purposes. Discussion or citation of a reference herein will not be construed as an admission that such reference is prior art to the present invention.

What is claimed is:

1. A method performed by a physical computing system comprising at least one processor, said method comprising:
   receiving data indicative of an informative zone of a background image;
   computing an estimated foreground area on a canvas for each candidate placement of the background image on the canvas, wherein the estimated foreground area is computed based on the data indicative of the informative zone and the number of images to be used as foreground images, and wherein the estimated foreground area does not include the informative zone; and determining one of the candidate placements as a selected background placement based on the computed values of estimated foreground area, wherein a composite image is generated from the background image positioned on the canvas according to the selected background placement and foreground images positioned outside of the informative zone.

2. The method of claim 1, wherein the candidate placement having the highest value of estimated foreground area is determined as the selected background placement.

3. The method of claim 1, wherein the value of estimated foreground area for a candidate placement is computed based on the data indicative of the informative zone, the number of images to be used as foreground images, the aspect ratio of each foreground image and width and height of the canvas.

4. The method of claim 3, wherein computing the value of estimated foreground area for a candidate placement further comprises applying a scaling factor to the background image, wherein the value of the scaling factor is constrained by a ratio of total foreground image area to background image area.

5. The method of claim 1, wherein determining one of the candidate placements as a selected background placement comprises computing a candidate placement score for each candidate placement, and wherein the candidate placement score is computed based on the value of estimated foreground area of the candid placement and a measure of visual balance of the candidate placement.

6. The method of claim 5, wherein determining one of the candidate placements as a selected background placement comprises determining the candidate placement having the highest value of candidate placement score.

7. The method of claim 5, wherein computing the measure of visual balance of the candidate placement comprises assigning a value of a weight to each of the foreground images, and the informative zone of the background image, and computing a $$\text{balance} = 1 - \frac{\sum_{i=1}^{k} |c_{wi} - c_{ui}|^b}{k},$$

along at least one of the dimensions of the canvas, wherein $C_{wi}$ is a cumulative weight at a location on the canvas, $C_{ui}$ is a cumulative uniform distribution at the location, k is the number of pieces of the canvas at which a deviation of $C_{wi}$ from $C_{ui}$ is determined, and b is a coefficient.

8. The method of claim 7, wherein the background placement score is computed as score=$S_{fore}*(B_x*B_y)^\alpha$, wherein $S_{fore}$ is the estimated foreground area, $B_x$, is a balance metric computed along a horizontal direction relative to the canvas, $B_y$ is a balance metric computed along a vertical direction relative to the canvas, and $\alpha$ is a numerical value that indicates the weight of the balance metric relative to the estimated foreground area.

9. The method of claim 8, wherein $\alpha$ is 2.

10. The method of claim 1, wherein a dimension along an axis of the canvas is greater than a dimension of the background image along the same axis, and wherein the method further comprises reflecting a portion of the background image along the axis to provide an adapted background image that conforms to the dimensions of the canvas.

11. The method of claim 1, wherein a dimension along an axis of the canvas is greater than a dimension of the background image along the same axis, and wherein the method further comprises adding content from a portion of an image in a collection of images to extend the dimension of the background image along the axis to provide an adapted background image that conforms to the dimensions of the canvas.

12. The method of claim 1, wherein the data indicative of the informative zone of the background image corresponds to a region of interest of the background image.

13. The method of claim 1, further comprising generating the composite image from the background image positioned on the canvas according to the selected background placement, and the foreground images positioned outside of the informative zone, and wherein the canvas is a region of a photobook, a photo album, a brochure, a magazine, a printable product, a fabric, a surface, a printable surface, or a screen.

14. A method performed by a physical computing system comprising at least one processor, said method comprising:

receiving data indicative of an informative zone of a background image;

computing a foreground layout area on a canvas for each candidate placement of the background image on the canvas, wherein the foreground layout area is determined based on the data indicative of the informative zone, and wherein the foreground layout area does not include the informative zone; and determining one of the candidate placements as a selected background placement based on the computed values of foreground layout area, wherein a composite image is generated from the background image positioned on the canvas according to the selected background placement and foreground images positioned outside of the informative zone.

15. The method of claim 14, wherein determining one of the candidate placements as a selected background placement comprises computing a candidate placement score for each candidate placement, and wherein the candidate placement score is computed based on the value of foreground layout area of the candidate placement and a measure of visual balance of the candidate placement.

16. The method of claim 15, wherein determining one of the candidate placements as a selected background placement comprises determining the candidate placement having the highest value of candidate placement score.

17. A computerized apparatus, comprising:

a memory storing computer-readable instructions; and a processor coupled to the memory, to execute the instructions, and based at least in part on the execution of the instructions, to:

receive data indicative of an informative zone of a background image;

compute an estimated foreground area on a canvas for each candidate placement of the background image on the canvas, wherein the estimated foreground area is computed based on the data indicative of the informative zone and the number of images to be used as foreground images, and wherein the estimated foreground area does not include the informative zone; and determine one of the candidate placements as a selected background placement based on the computed values of estimated foreground area, wherein a composite image is generated from the background. image positioned on the canvas according to the selected background placement and foreground images positioned outside of the informative zone.

18. The apparatus of claim 17, further comprising a composite image generator to generate the composite image from the background image positioned on the canvas according to the selected background placement, and the foreground images positioned outside of the informative zone, and wherein the canvas is a region of a photobook, a photo album, a brochure, a magazine, a printable product, a fabric, a surface, :printable surface, or a screen.

19. A non-transitory computer-readable storage medium, comprising instructions executable to:

receive data indicative of an informative zone of a background image;

compute an estimated foreground area on a canvas for each candidate placement of the background image on the canvas, wherein the estimated foreground area is computed based on the data indicative of the informative zone and the number of images to be used as foreground images, and wherein the estimated foreground area does not include the informative zone; and determine one of the candidate placements as a selected background placement based on the computed values of estimated foreground area, wherein a composite image is generated from the background image positioned on the canvas according to the selected background placement and foreground images positioned outside of the informative zone.

20. The non-transitory computer-readable storage medium of claim 19, further comprising instructions to generate the composite image from the background image positioned on the canvas according to the selected background placement, and the foreground images positioned outside of the informative zone, and wherein the canvas is a region of a photobook, a photo album, a brochure, a magazine, a printable product, a fabric, a surface, a printable surface, or a screen.

* * * * *

UNITED STATES PATENT AND TRADEMARK OFFICE
CERTIFICATE OF CORRECTION

PATENT NO. : 8,682,108 B2
APPLICATION NO. : 13/094097
DATED : March 25, 2014
INVENTOR(S) : Aibo Tian et al.

Page 1 of 1

It is certified that error appears in the above-identified patent and that said Letters Patent is hereby corrected as shown below:

In the specification

In column 1, line 16, delete "Information" and insert -- Informative --, therefor.

In the claims

In column 15, line 28, in Claim 5, delete "candid" and insert -- candidate --, therefor.

In column 15, line 53, in Claim 8, delete "$B_x$," and insert -- $B_x$ --, therefor.

In column 16, line 64, in Claim 17, delete "background." and insert -- background --, therefor.

In column 17, line 8, in Claim 18, delete ":printable" and insert -- a printable --, therefor.

Signed and Sealed this
Twelfth Day of January, 2016

Michelle K. Lee
*Director of the United States Patent and Trademark Office*